United States Patent
Witzman

(10) Patent No.: US 12,103,327 B2
(45) Date of Patent: Oct. 1, 2024

(54) ORIENTING MAGNETIC FLAKES WITHIN A BINDER LAYER

(71) Applicant: VIAVI Solutions Inc., Chandler, AZ (US)

(72) Inventor: Matthew R. Witzman, Windsor, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 168 days.

(21) Appl. No.: 17/819,387

(22) Filed: Aug. 12, 2022

(65) Prior Publication Data

US 2022/0388328 A1   Dec. 8, 2022

Related U.S. Application Data

(63) Continuation of application No. 17/210,171, filed on Mar. 23, 2021, now Pat. No. 11,427,026.

(51) Int. Cl.
*B42D 25/369* (2014.01)
*B05D 3/00* (2006.01)
*B42D 25/40* (2014.01)

(52) U.S. Cl.
CPC ........... *B42D 25/369* (2014.10); *B05D 3/207* (2013.01); *B42D 25/40* (2014.10)

(58) Field of Classification Search
CPC ........ B42D 25/29; B42D 25/36; B42D 25/40; G06K 19/16; G06K 19/18; B41M 3/14; B41M 3/148; B05D 5/06; B05D 5/065; B05D 5/063; B05D 5/061; B05D 5/066; B05D 3/207; B05D 5/65; B05D 5/61;
(Continued)

(56) References Cited

U.S. PATENT DOCUMENTS

| 5,869,148 A | 2/1999 | Silverschotz et al. |
| 6,403,169 B1 | 6/2002 | Hardwick et al. |
| 11,427,026 B1 | 8/2022 | Witzman |

(Continued)

FOREIGN PATENT DOCUMENTS

| EP | 0373898 | * | 6/1990 |
| EP | 2716371 A1 | | 4/2014 |

(Continued)

OTHER PUBLICATIONS

Document# 1 (Year: 1985).*
Extended European Search Report for Application No. EP21198953, mailed on Mar. 18, 2022, 9 pages.

*Primary Examiner* — Tabassom Tadayyon Eslami
(74) *Attorney, Agent, or Firm* — Harrity & Harrity, LLP

(57) ABSTRACT

A deposition device may deposit, on a substrate, a binder layer that includes a first set of magnetic flakes and a second set of magnetic flakes and may cause, when a temperature of the binder layer satisfies a temperature threshold (e.g., a Curie temperature of the first set of magnetic flakes), a magnetic field to be applied to the binder layer to cause the first set of magnetic flakes and the second set of magnetic flakes to be oriented according to the magnetic field. The deposition device may cause, when the temperature of the binder layer ceases to satisfy the temperature threshold, another magnetic field to be applied to the binder layer to cause only the second set of magnetic flakes to be oriented according to the other magnetic field.

20 Claims, 10 Drawing Sheets

(58) Field of Classification Search
CPC ........ B05D 5/63; B05D 5/66; B05D 2601/10; B05D 3/067; C09D 5/23
USPC ..................................... 427/550, 547, 598
See application file for complete search history.

(56) References Cited

U.S. PATENT DOCUMENTS

| | | |
|---|---|---|
| 2005/0123764 A1 | 6/2005 | Hoffmann et al. |
| 2013/0270344 A1 | 10/2013 | Heck et al. |
| 2017/0259299 A1 | 9/2017 | Miller et al. |

FOREIGN PATENT DOCUMENTS

| | | | |
|---|---|---|---|
| EP | 3459758 A1 | | 3/2019 |
| JP | H0149053 | * | 2/1998 |
| WO | 2020018771 A1 | | 1/2020 |
| WO | 2020246659 A1 | | 12/2020 |

* cited by examiner

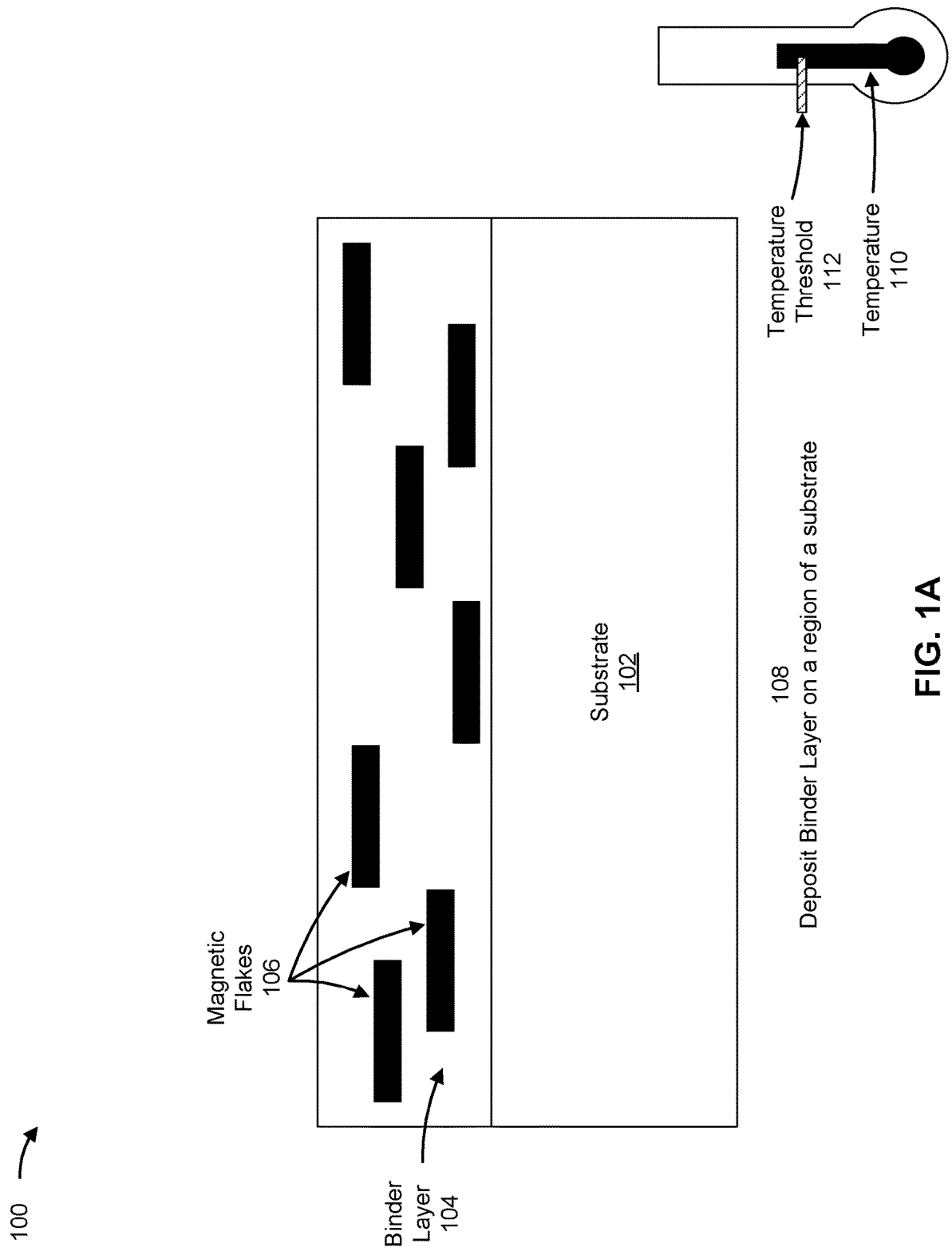

ORIENTING MAGNETIC FLAKES WITHIN A BINDER LAYER

RELATED APPLICATION

This application is a continuation of U.S. patent application Ser. No. 17/210,171, filed Mar. 23, 2021 (now U.S. Pat. No. 11,427,026), which is incorporated herein by reference in its entirety.

BACKGROUND

Some documents, such as monetary instruments, may include one or more security features to combat counterfeiting. For example, a surface of a document may include a coating of magnetic ink that includes magnetically aligned magnetic flakes to create an optical feature (e.g., a color-shifting feature or a reflectivity feature) that is difficult to replicate using traditional non-magnetic ink.

SUMMARY

In some implementations, a method includes depositing, by a deposition device and on a region of a substrate, a binder layer that includes a plurality of magnetic flakes; cooling, by the deposition device, the binder layer to cause a temperature of the binder layer to satisfy a temperature threshold; applying, by the deposition device, a magnetic field to the binder layer to cause at least one magnetic flake, of the plurality of magnetic flakes, to align with a magnetic field line of the magnetic field; and curing, by the deposition device, the binder layer.

In some implementations, a method includes depositing, by a deposition device and on a region of a substrate, a binder layer that includes a first set of magnetic flakes and a second set of magnetic flakes; causing, by the deposition device and when a temperature of the binder layer satisfies a temperature threshold, a magnetic field to be applied to the binder layer to cause the first set of magnetic flakes and the second set of magnetic flakes to be oriented according to the magnetic field; and causing, by the deposition device, an orientation of the first set of magnetic flakes and an orientation of the second set of magnetic flakes to be fixed.

In some implementations, a security article comprises a single binder layer deposited on a surface of the security article, wherein the binder layer comprises: a first set of magnetic flakes fixed in the binder layer at a first orientation; and a second set of magnetic flakes fixed in the binder layer at a second orientation.

BRIEF DESCRIPTION OF THE DRAWINGS

FIGS. 1A-1D are diagrams of an example implementation described herein.

DETAILED DESCRIPTION

Figure 1B:
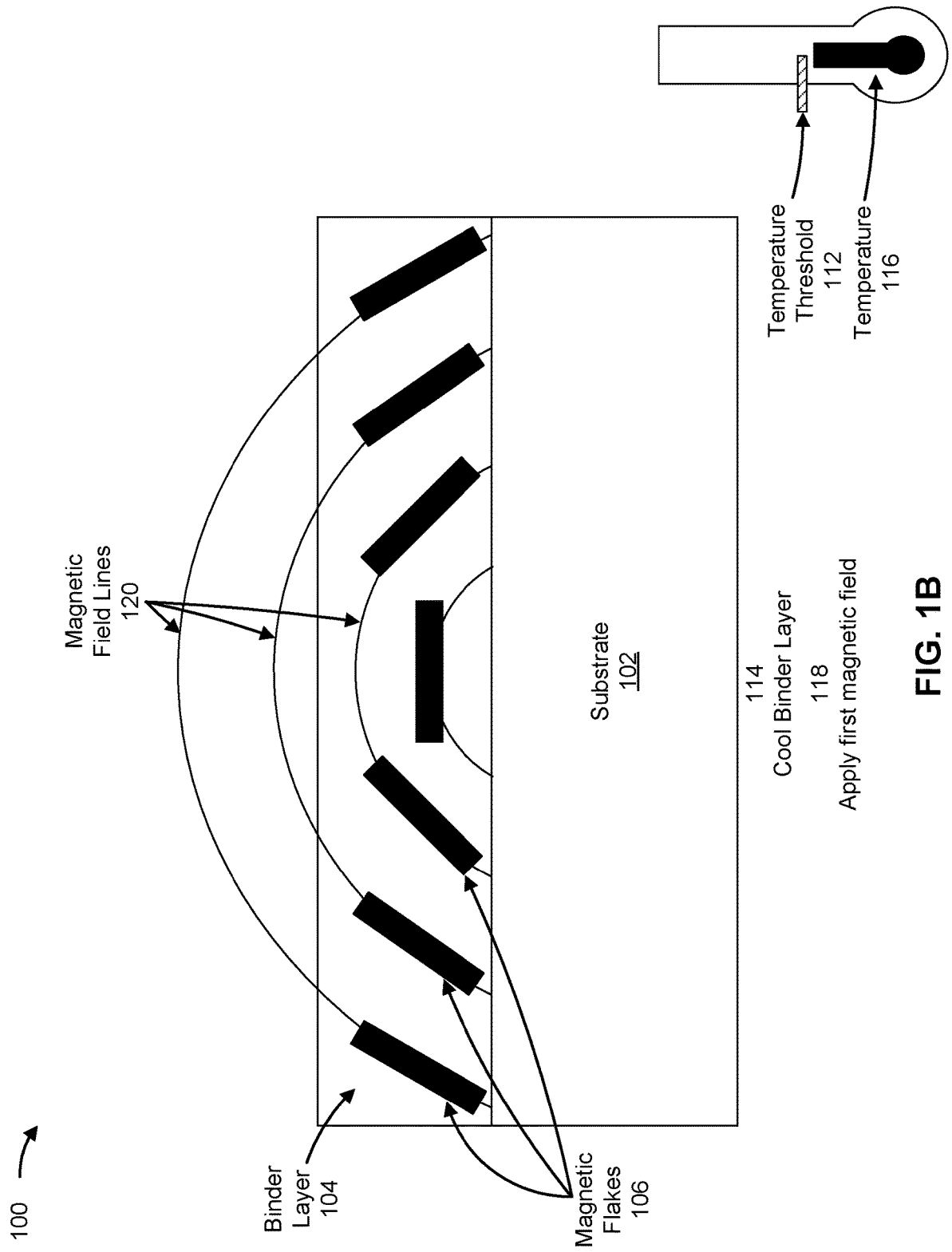

The following detailed description of example implementations refers to the accompanying drawings. The same reference numbers in different drawings may identify the same or similar elements.

A document, such as paper currency, may include one or more optical security features, such as a watermark, an image, a graphic, or a pattern, printed with color-shifting ink, on a region of the document. A person may inspect, or may use a validation device, to analyze the document to determine that the one or more optical security features are present in the security article. Based on identifying the one or more optical security features, the person may be confident, or the validation device may determine, that the document is genuine. For example, a person may view a watermark in a dollar bill and may conclude that the dollar bill is not counterfeit.

In many cases, a typical magnetic binder layer that includes magnetic pigment may be deposited on a document and manipulated by a magnetic field to create an optical security feature, such as a color-shifting printed image (e.g., a printed image that appears to change colors when observed from different viewing angles). However, a complexity of the optical feature is limited by a structure of the applied magnetic field. Accordingly, the optical feature may be able to be reproduced (or a facsimile optical feature that appears to be similar to the optical feature may be produced), which enables counterfeiting of the document and increases a likelihood that the counterfeit document is deemed legitimate.

Some implementations described herein provide a deposition device. The deposition device may deposit, on a substrate, a binder layer that includes a first set of magnetic flakes and a second set of magnetic flakes (e.g., that are associated with the same or different pigments). The deposition device may cause, when a temperature of the binder layer satisfies a temperature threshold (e.g., a Curie temperature of the first set of magnetic flakes), a magnetic field to be applied to the binder layer to cause the first set of magnetic flakes and the second set of magnetic flakes to be oriented according to the magnetic field. The deposition device may cause, when the temperature of the binder layer ceases to satisfy the temperature threshold, another magnetic field to be applied to the binder layer to cause only the second set of magnetic flakes to be oriented according to the other magnetic field. The deposition device then may cure the binder layer to cause respective orientations of the first set of magnetic flakes and the second set of magnetic flakes to be fixed.

In this way, the deposition device allows for multiple magnetic fields (e.g., that may have different axes of orientation) to be used to create an optical security feature, such as a color-shifting pattern (e.g., with one or more or metameric effects), on a region of the substrate. Accordingly, the optical security feature has an increased complexity as compared to an optical security feature created using a typical magnetic binder layer and a single magnetic field. Further, the optical security feature may have a magnetic susceptibility that predictably changes near a Curie temperature of the first set of magnetic flakes and/or the second set of magnetic flakes, which can be tested (e.g., using a scanning device) to authenticate the optical security feature. In this way, the optical feature is harder to reproduce (and/or a facsimile optical feature is harder to produce), which reduces a likelihood of counterfeiting of the document. This also reduces a likelihood that a counterfeit document is deemed legitimate. Accordingly, use of technical resources, such as computing resources (e.g., processing resources, memory resources, communication resources, and/or power resources, among other examples) to investigate counterfeiting, scan potentially counterfeit documents, identify counterfeit documents, and/or analyze counterfeit documents, among other examples may be reduced.

FIGS. 1A-1D are diagrams of an example implementation 100 described herein. As shown in FIGS. 1A-1D, implementation 100 may include a substrate 102, a binder layer 104, and a plurality of magnetic flakes 106 (e.g., included in the binder layer 104). The substrate 102 may comprise a paper material, a plastic material, and/or a polymer material, among other examples. For example, the substrate 102 may include a document, such as a security article (e.g., currency, a bank note, a government issued identification card, or a transaction card, among other examples).

The binder layer 104 may include a binder (e.g., an organic binder) in which particles associated with a particular pigment (or a mix of particular pigments) are suspended. In some implementations, the plurality of magnetic flakes may be suspended in the binder of the binder layer 104 (e.g., with other particles of the binder layer 104).

The plurality of magnetic flakes 106 may comprise a ferromagnetic material that causes the plurality of magnetic flakes 106 to be magnetic. In some implementations, the plurality of magnetic flakes 106 may comprise a material with a Curie temperature (e.g., a temperature below which the material exhibits a ferromagnetic property and above which the material does not exhibit the ferromagnetic property) at or near an operation temperature of a deposition device (described herein). For example, the plurality of magnetic flakes 106 may comprise a material that has a Curie temperature between −10 and 60 degrees Celsius (C) (e.g., greater than or equal to −10 degrees C. and less than or equal to 60 degrees C.), such as a material comprising gadolinium, a gadolinium alloy, a Monel alloy (e.g., that comprises nickel and copper), an iron alloy (e.g., that comprises iron, nickel, manganese, germanium, silicon, and/or chromium, among other examples), a platinum cobalt alloy, and/or one or more other ferromagnetic compositions or alloys.

In some implementations, the plurality of magnetic flakes 106 may be associated with the particular pigment (or the mix of particular pigments) of the binder layer 104. For example, a magnetic flake 106, of the plurality of magnetic flakes 106, may include an outer layer that appears, when viewed by an observer of the binder layer 104, to have a same or similar color as the particular pigment. In some implementations, the magnetic flake 106 may have a color-shifting property, such that the magnetic flake 106 (e.g., the outer layer of the magnetic flake 106) appears to have a first particular color at a first viewing angle and a second particular color at a second viewing angle. Further, the magnetic flake 106 may include a ferromagnetic core (e.g., that comprises a material with a Curie temperature between −10 and 60 degrees C.). Accordingly, in some implementations, the plurality of magnetic flakes 106 may comprise magnetic pigment flakes (e.g., magnetic color-shifting pigment flakes).

As shown in FIG. 1A, and by reference number 108, a deposition device (e.g., a printing device, a spraying device, and/or a painting device, among other examples) may deposit the binder layer 104 on a region of the substrate 102 (e.g., on a region of a top surface of the substrate 102, as shown in FIG. 1A). In some implementations, the deposition device may deposit the binder layer 104 at a temperature 110 (e.g., a temperature of the binder layer 104 and/or the substrate 102 is the temperature 110 at the time the deposition device deposits the binder layer 104 on the region of the substrate 102). As shown in FIG. 1A, the temperature 110 may not satisfy (e.g., may be greater than or equal to) a temperature threshold 112, which is associated with a Curie temperature of the plurality of magnetic flakes 106. For example, the temperature threshold 112 may be 20 degrees C. (e.g., between −10 and 60 degrees C.) and the temperature 110 of the binder layer 104 and/or the substrate 102 when the binder layer 104 is deposited on the region of the substrate 102 may be 30 degrees C. Alternatively, the temperature 110 of the binder layer 104 and/or the substrate may satisfy (e.g., may be less than) the temperature threshold 112 when the binder layer 104 is deposited on the region of the substrate 102.

As further shown in FIG. 1A, after the binder layer 104 is deposited on the region of the substrate 102, the plurality of magnetic flakes 106 may be suspended in the binder layer 104 approximately parallel (e.g., within a tolerance, such as 5 degrees) to a surface of the substrate 102 (e.g., the top surface of the substrate 102). The plurality of magnetic flakes 106 may have this parallel orientation within the binder layer 104 due to a deposition technique of the deposition device. Additionally, or alternatively, a magnetic field may be applied to the binder layer 104 (e.g., after the binder layer 104 is cooled, as described herein in relation to FIG. 1B and reference number 114) to cause the plurality of magnetic flakes 106 to have the parallel orientation. Additional details relating to applying magnetic fields to orient the plurality of magnetic flakes 106 within the binder layer 104 are further described herein.

As shown in FIG. 1B, and by reference number 114, the deposition device may cause the binder layer 104 and/or the substrate 102 to be cooled. For example, the deposition device may transport (e.g., via a conveyor belt) the substrate 102 (with the binder layer 104 deposited on the region of the substrate 102) to a low temperature environment to allow the binder layer 104 and/or the substrate 102 to cool. As further shown in FIG. 1B, this may cause a temperature 116 of the binder layer 104 and/or the substrate 102 to satisfy (e.g., be less than) the temperature threshold 112. For example, the temperature threshold 112 may be 20 degrees C. (e.g., between −10 and 60 degrees C.), and the temperature 116 of the binder layer 104 and/or the substrate 102 may be 15 degrees C. after the binder layer 104 and/or the substrate 102 have cooled.

As further shown in FIG. 1B, and by reference number 118, the deposition device may apply a first magnetic field to the binder layer 104 (e.g., when the temperature 116 of the binder layer 104 and/or the substrate 102 satisfies the temperature threshold 112). For example, the deposition device may include, or may be associated with, a first magnet assembly that includes one or more permanent magnets. The first magnet assembly may create the first magnetic field that includes magnetic field lines 120. The deposition device may cause the first magnet assembly to be positioned near the substrate 102 (e.g., by moving the first magnet assembly towards the substrate 102, or vice versa) to allow the first magnetic field to be applied to the binder layer 104. This may cause the plurality of magnetic flakes 106 to be oriented according to the first magnetic field. For example, as shown in FIG. 1B, this may cause one or more magnetic flakes 106, of the plurality of magnetic flakes 106, to align with respective magnetic field lines 120 of the first magnetic field. Accordingly, at least some of the plurality of magnetic flakes 106 may be oriented within the binder layer 104 at respective non-parallel angles to a surface of the substrate 102 (e.g., the top surface of the substrate 102).

Figure 1C:
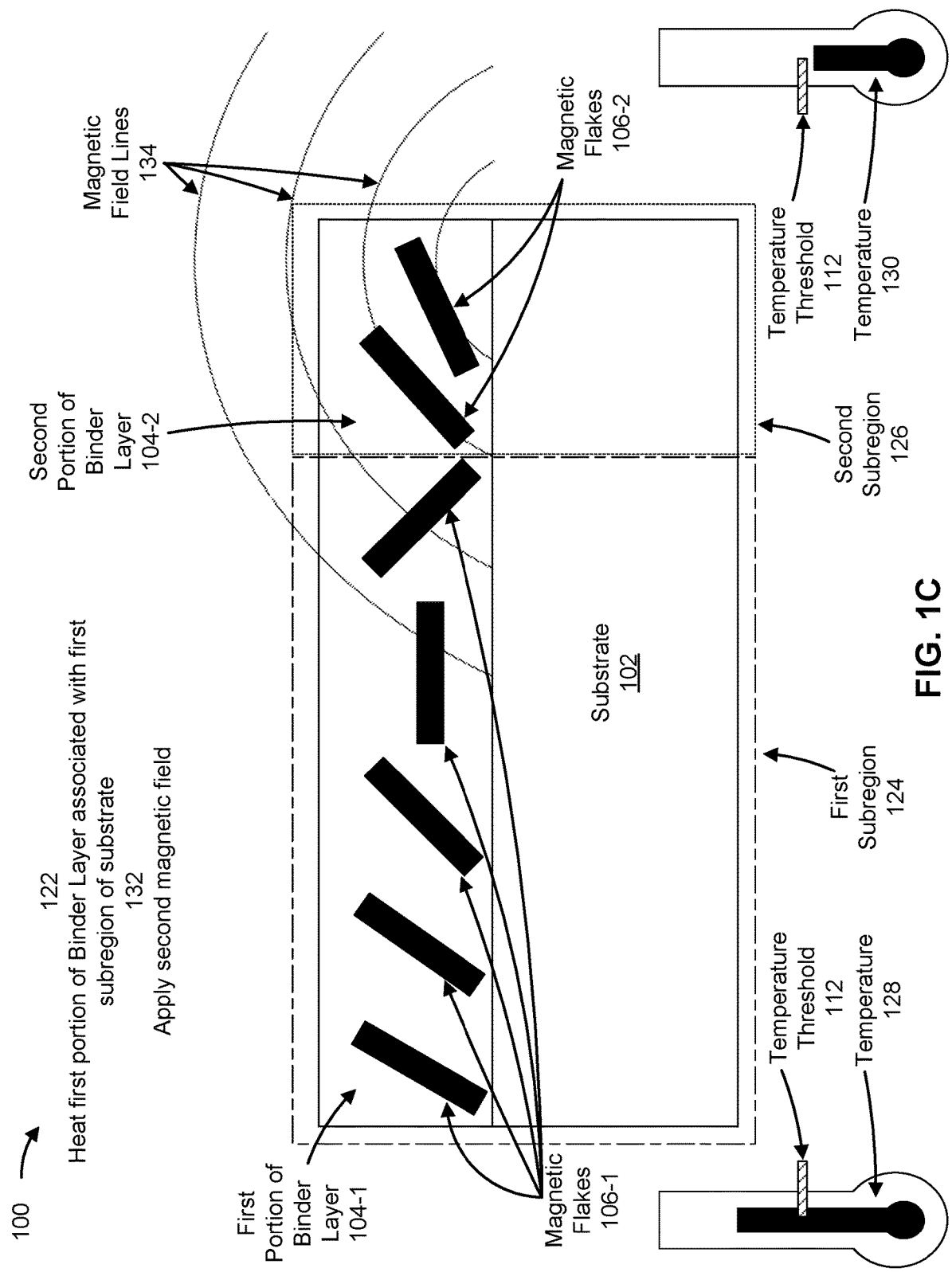

As shown in FIG. 1C, and by reference number 122, the deposition device may cause a first portion 104-1 of the binder layer 104 (e.g., that is deposited on a first subregion 124 of the substrate 102) and/or the first subregion 124 of the substrate 102 to be heated. For example, the deposition device may cause a laser device to apply laser heating to the first portion 104-1 of the binder layer 104 and/or may cause a heated roller (e.g., an embossed roller) to contact a surface (e.g., a bottom surface) of the substrate 102 associated with the first subregion 124. As another example, the deposition device may apply an insulative mask, or other insulative material, on a second portion 104-2 of the binder layer 104 (e.g., that is deposited on a second subregion 126 of the substrate 102) and/or the second subregion 126 of the substrate 102 and cause a heater device (e.g., an infrared heater) to apply heat to the binder layer 104 and/or the substrate 102.

In this way, as further shown in FIG. 1C, the deposition device may cause a temperature 128 of the first portion 104-1 of the binder layer 104 and/or the first subregion 124 of the substrate 102 to not satisfy (e.g., to be greater than or equal to), or to cease satisfying, the temperature threshold 112 (e.g., that is associated with the Curie temperature of the plurality of magnetic flakes 106). Additionally, or alternatively, the deposition device may cause (or allow) a temperature 130 of the second portion 104-2 of the of the binder layer 104 and/or the second subregion 126 of the substrate 102 to remain at the temperature 116 (e.g., at which the binder layer 104 and/or the substrate was cooled to, as described in relation to FIG. 1B and reference number 114) or to rise only to another temperature that is less than the temperature threshold 112. Therefore, the deposition device may cause the temperature 130 to satisfy (e.g., be less than) the temperature threshold 112.

As further shown in FIG. 1C, the first portion 104-1 of the binder layer 104 may include a first set of magnetic flakes 106-1, of the plurality of flakes 106 and the second portion 104-2 of the binder layer 104 may include a second set of magnetic flakes 106-2, of the plurality of flakes 106. After causing the first portion 104-1 of the binder layer 104 and/or the first subregion 124 of the substrate 102 to be heated such that the temperature 128 does not satisfy, or ceases to satisfy, the temperature threshold 112, the first set of magnetic flakes 106-1 may not exhibit, or may no longer exhibit, a ferromagnetic property. The first set of magnetic flakes 106-1 therefore may not be susceptible to being oriented according to a magnetic field. Additionally, or alternatively, after preventing the second portion 104-2 of the binder layer 104 and/or the second subregion 126 of the substrate 102 from being heated (or allowing the second portion 104-2 of the binder layer 104 and/or the second subregion 126 of the substrate 102 to remain cool) such that the temperature 130 satisfies the temperature threshold 112, the second set of magnetic flakes 106-2 may exhibit, or may continue to exhibit, a ferromagnetic property. The second set of magnetic flakes 106-2 therefore may be susceptible to being oriented according to a magnetic field.

As further shown in FIG. 1C, and by reference number 132, the deposition device may apply a second magnetic field (e.g., that is the same as or different from the first magnetic field) to the binder layer 104 (e.g., when the temperature 128 does not satisfy the temperature threshold 112 and the temperature 130 satisfies the temperature threshold 112). For example, the deposition device may include, or may be associated with, a second magnet assembly that includes one or more permanent magnets. The second magnet assembly may create the second magnetic field that includes magnetic field lines 134. The deposition device may cause the second magnet assembly to be positioned near the substrate 102 (e.g., by moving the second magnet assembly towards the substrate 102, or vice versa) to allow the second magnetic field to be applied to the binder layer 104. This may cause the second set of magnetic flakes 106-2 (and not the first set of magnetic flakes 106-1) to be oriented according to the second magnetic field. For example, as shown in FIG. 1C, this may cause one or more magnetic flakes 106-2, of the second set of magnetic flakes 106-2, to align with respective magnetic field lines 134 of the second magnetic field. Accordingly, at least some of the second set of magnetic flakes 106-2 may be oriented within the binder layer 104 at respective non-parallel angles to a surface of the substrate 102 (e.g., the top surface of the substrate 102). Moreover, as further shown in FIG. 1C, because the first set of magnetic flakes 106-1 are not affected by the second magnetic field, the first set of magnetic flakes 106-1 may remain oriented according to the first magnetic field (e.g., an orientation of the first set of magnetic flakes 106-1 does not change).

While FIGS. 1B and 1C show the magnetic field lines 120 of the first magnetic field and the magnetic field lines 134 of the second magnetic field as similarly oriented in a particular one-dimensional direction, implementations include the magnetic field lines 120 and the magnetic field lines 134 being similarly or differently oriented in two dimensions (e.g., across the surface of the substrate 102 and/or the binder layer 104). For example, the magnetic field lines 120 and the magnetic field 134 may have an orthogonal orientation to each other. This may cause the first set of magnetic flakes 106-1 to have an orthogonal orientation to the second set of magnetic flakes 106-2, which may facilitate an appearance of a metameric effect (e.g., a color-shifting effect) associated with the binder layer 104.

Figure 1D:
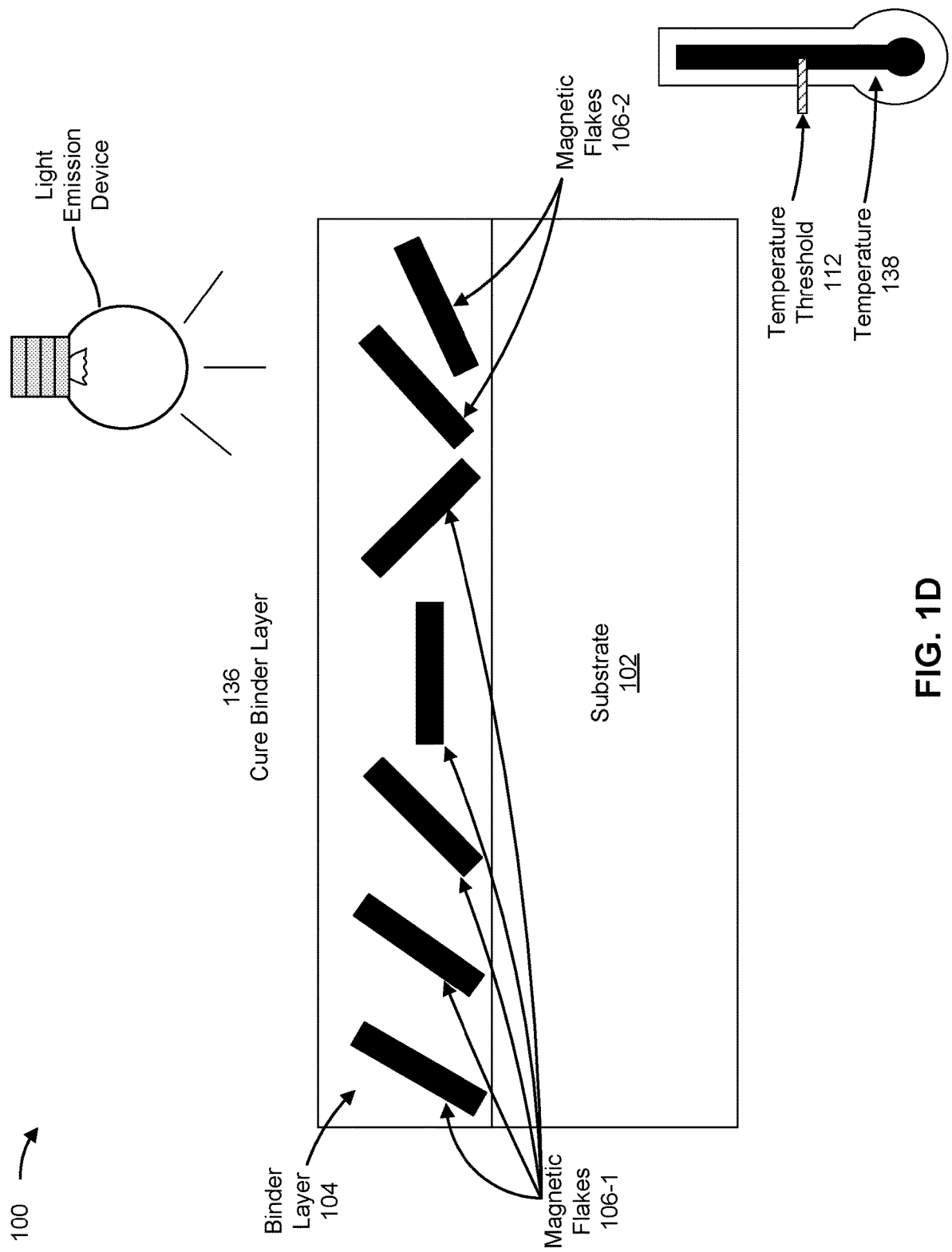

As shown in FIG. 1D, and by reference number 136, the deposition device may cure the binder layer 104. For example, the deposition device may cause a light emission device (e.g., that includes a light emitting diode (LED) and/or an incandescent light) to generate and apply ultraviolet (UV) light to the binder layer 104 and/or the substrate 102. This may cause cross linking within the binding layer 104 that allows the binder layer 104 to cure. As another example, the deposition device may cause a laser device, a heated roller, and/or a heater device, among other examples, to apply heat to the binder layer 104 and/or the substrate 102. This may cause a temperature 138 of the binder layer 104 to be associated with a temperature that allows the binder layer 104 to cure, which may be greater than the temperature threshold 112 (e.g., that is associated with the Curie temperature of the plurality of magnetic flakes 106).

In this way, an orientation of the plurality of magnetic flakes 106 may be fixed within the binder layer 104. For example, the first set of magnetic flakes 106-1 may be fixed at a first orientation (e.g., according to the first magnetic field) and the second set of magnetic flakes 106-2 may be fixed at a second orientation (e.g., according to the second magnetic field) within the binder layer 104.

As indicated above, FIGS. 1A-1D are provided merely as one or more examples. Other examples may differ from what is described with regard to FIGS. 1A-1D.

FIGS. 2A-2D are diagrams of an example implementation 200 described herein. As shown in FIGS. 2A-2D, implementation 200 may include a substrate 202, a binder layer 204, and a plurality of magnetic flakes 206 (e.g., included in the binder layer 204). The substrate 202, the binder layer 204, and/or the plurality of magnetic flakes 206 may be the same as, or similar to, the substrate 102, the binder layer 104, and/or the plurality of magnetic flakes 106 described herein in relation to FIGS. 1A-1D. For example, the substrate 202 may include a document, such as a security article, and the binder layer 204 may include a binder (e.g., an organic binder) in which particles associated with a particular pigment (or a mix of particular pigments) and/or the plurality of magnetic flakes 206 are suspended.

Figure 2A:
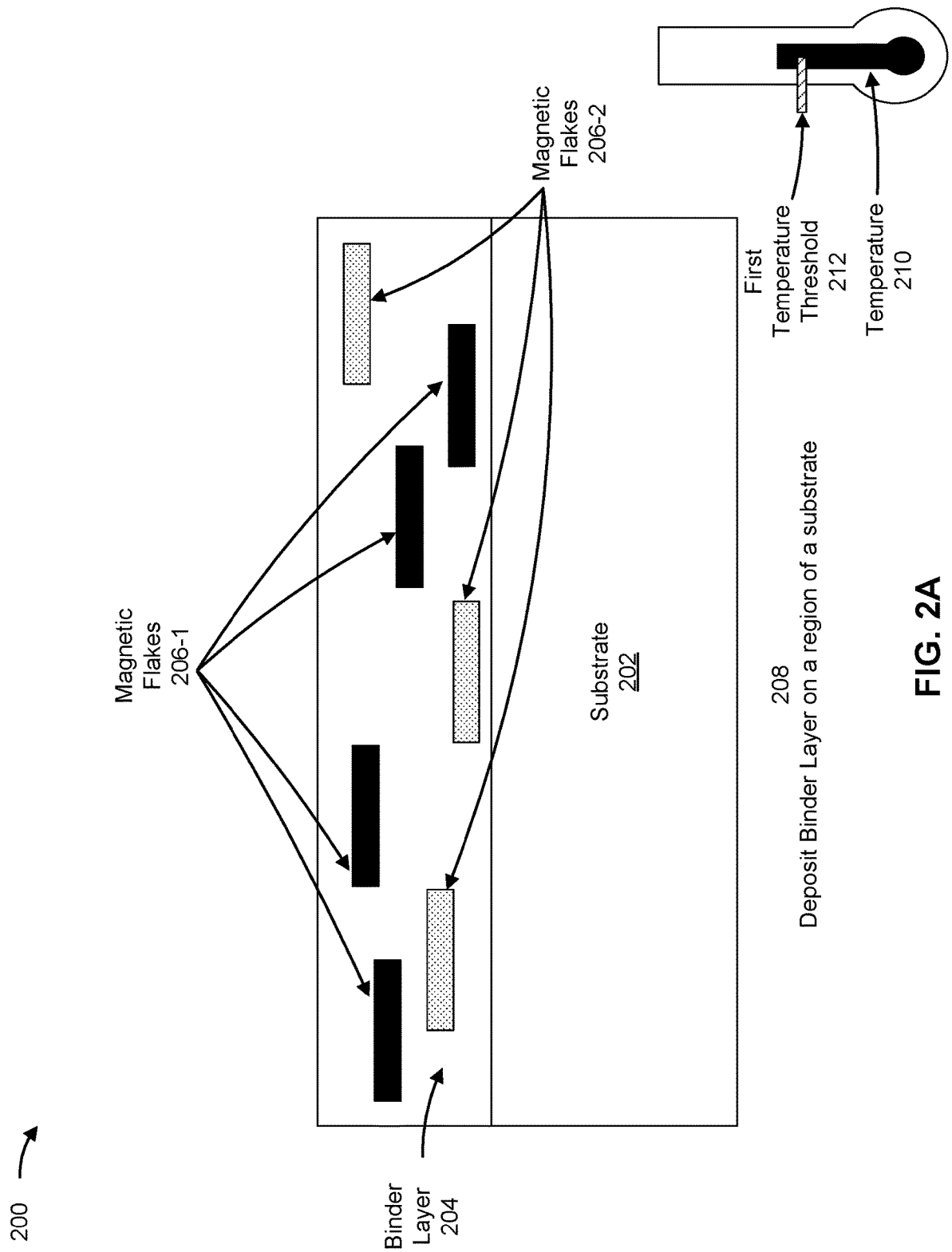
FIGS. 2A-2D are diagrams of an example implementation described herein.

The plurality of magnetic flakes 206 may comprise two or more sets of different magnetic flakes 206. For example, as shown in FIG. 2A, the plurality of magnetic flakes may comprise a first set of magnetic flakes 206-1 and a second set of magnetic flakes 206-2. The first set of magnetic flakes 206-1 may comprise a ferromagnetic material with a first Curie temperature and the second set of magnetic flakes 206-2 may comprise a ferromagnetic material with a second Curie temperature (e.g., that is higher than the first Curie temperature). For example, the first set of magnetic flakes 206-1 may comprise a material that has a Curie temperature between −10 and 60 degrees C. (e.g., greater than or equal to −10 degrees C. and less than or equal to 60 degrees C.), such as a material comprising gadolinium, a gadolinium alloy, a Monel alloy, an iron alloy, a platinum cobalt alloy, and/or one or more other ferromagnetic compositions or alloys. The second set of magnetic flakes 206-2 may comprise a material that has a Curie temperature that is greater than or equal to the Curie temperature of the first set of magnetic flakes 206-1 (e.g., greater than or equal to 61 degrees C.), such as a material comprising gadolinium, a gadolinium alloy, a Monel alloy, an iron alloy, a platinum cobalt alloy, stainless steel, and/or one or more other ferromagnetic compositions or alloys. While examples described herein in relation to FIGS. 2A-2D are directed to two sets of different magnetic flakes 206, any number of sets of different magnetic flakes 206 are contemplated.

In some implementations, the first set of magnetic flakes 206-1 may be associated with a first particular pigment (or a first mix of particular pigments) of the binder layer 204 and the second set of magnetic flakes 206-2 may be associated with a second particular pigment (or a second mix of particular pigments) of the binder layer 204. For example, a magnetic flake 206-1, of the first set of magnetic flakes 206-1, may include an outer layer that appears, when viewed by an observer of the binder layer 204, to have a same or similar color as the first particular pigment and/or a magnetic flake 206-2, of the second set of magnetic flakes 206-2, may include an outer layer that appears, when viewed by an observer of the binder layer 204, to have a same or similar color as the second particular pigment. In some implementations, the first set of magnetic flakes 206-1 and the second set of magnetic flakes 206-2 may have color-shifting properties. Further, the first set of magnetic flakes 206-1 may include a first ferromagnetic core (e.g., that comprises a material with the first Curie temperature) and/or the second set of magnetic flakes 206-2 may include a second ferromagnetic core (e.g., that comprises a material with the second Curie temperature). Accordingly, in some implementations, the plurality of magnetic flakes 106 may comprise magnetic pigment flakes (e.g., magnetic color-shifting pigment flakes).

As shown in FIG. 2A, and by reference number 208, a deposition device (e.g., a printing device, a spraying device, and/or a painting device, among other examples) may deposit the binder layer 204 on a region of the substrate 202 (e.g., on a region of a top surface of the substrate 202, as shown in FIG. 2A). In some implementations, the deposition device may deposit the binder layer 204 at a temperature 210 (e.g., a temperature of the binder layer 204 and/or the substrate 202 is the temperature 210 at the time the deposition device deposits the binder layer 204 on the region of the substrate 202). As shown in FIG. 2A, the temperature 210 may not satisfy (e.g., may be greater than or equal to) a first temperature threshold 212, which may be associated with the first Curie temperature of the first set of magnetic flakes 206-1. For example, the first temperature threshold 212 may be 20 degrees C. (e.g., between −10 and 60 degrees C.) and the temperature 210 of the binder layer 204 and/or the substrate 202 when the binder layer 204 is deposited on the region of the substrate 202 may be 30 degrees C. Alternatively, the temperature 210 of the binder layer 204 and/or the substrate may satisfy (e.g., may be less than) the first temperature threshold 212 when the binder layer 204 is deposited on the region of the substrate 202.

As further shown in FIG. 2A, after the binder layer 204 is deposited on the region of the substrate 202, the plurality of magnetic flakes 206 may be suspended in the binder layer 204 approximately parallel (e.g., within a tolerance, such as 5 degrees) to a surface of the substrate 202 (e.g., the top surface of the substrate 202). The plurality of magnetic flakes may have this parallel orientation within the binder layer 204 due to a deposition technique of the deposition device or due application of a magnetic field (e.g., in a similar manner as that described elsewhere herein) to the binder layer 204. As additionally shown in FIG. 2A, the plurality of magnetic flakes 206 may include a heterogeneous mix of the first set of magnetic flakes 206-1 and the second set of magnetic flakes 206-2 within the binder layer 204 (e.g., the first set of magnetic flakes 206-1 and the second set of magnetic flakes 206-2 may be distributed and/or intermixed throughout the binder layer 204).

Figure 2B:
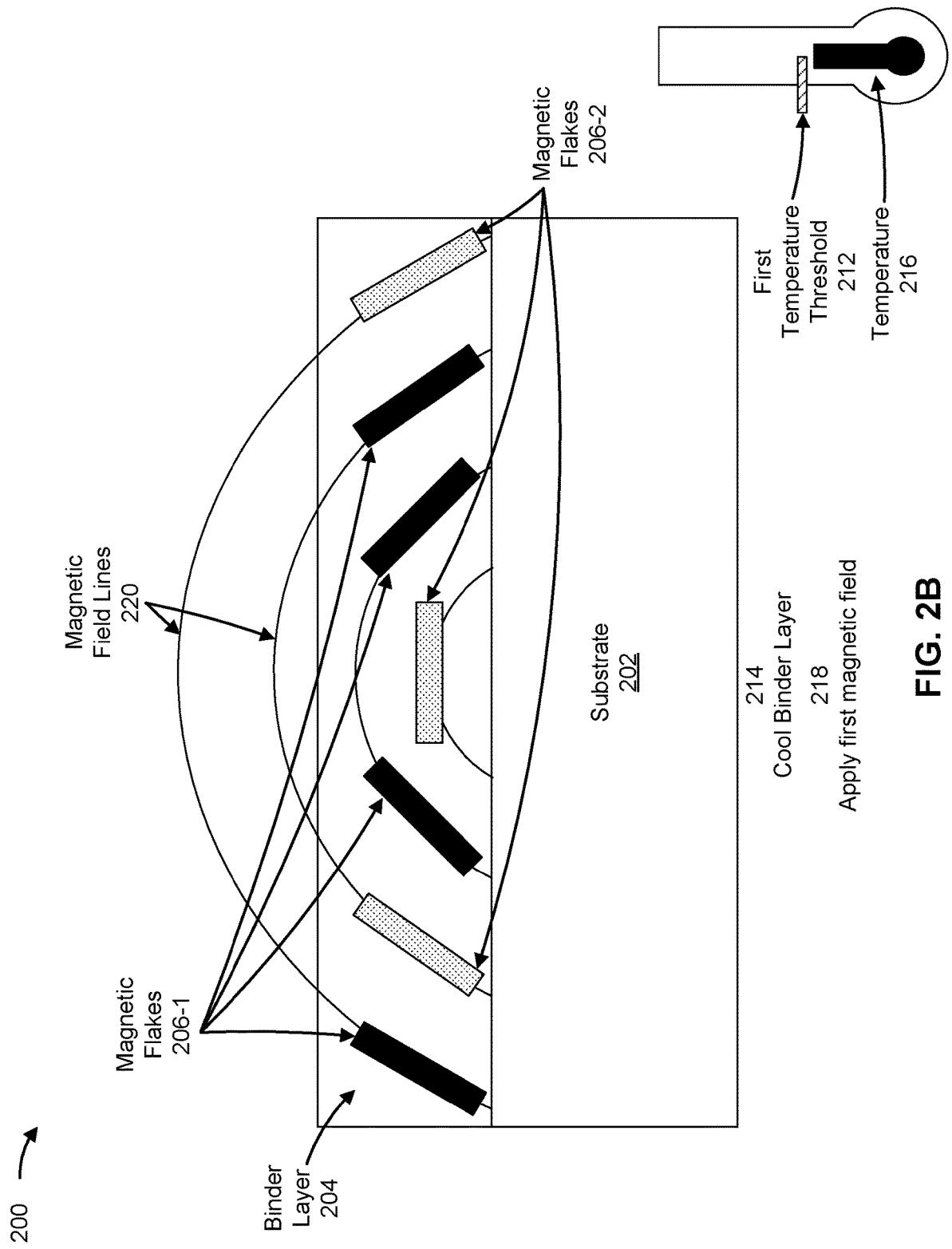

As shown in FIG. 2B, and by reference number 214, the deposition device may cause the binder layer 204 and/or the substrate 202 to be cooled. For example, the deposition device may transport (e.g., via a conveyor belt) the substrate 202 (with the binder layer 204 deposited on the region of the substrate 202) to a low temperature environment to allow the binder layer 204 and/or the substrate 202 to cool. As further shown in FIG. 2B, this may cause a temperature 216 of the binder layer 204 and/or the substrate 202 to satisfy (e.g., be less than) the first temperature threshold 212. For example, the first temperature threshold 212 may be 20 degrees C. (e.g., between −10 and 60 degrees C.) and the temperature 216 of the binder layer 204 and/or the substrate 202 may be 12 degrees C. after the binder layer 204 and/or the substrate 202 have cooled.

As further shown in FIG. 2B, and by reference number 218, the deposition device may apply a first magnetic field to the binder layer 204 (e.g., when the temperature 216 of the binder layer 204 and/or the substrate 202 satisfies the first temperature threshold 212). For example, the deposition device may include, or may be associated with, a first magnet assembly that includes one or more permanent magnets. The first magnet assembly may create the first magnetic field that includes magnetic field lines 220. The deposition device may cause the first magnet assembly to be positioned near the substrate 202 (e.g., by moving the first magnet assembly towards the substrate 202, or vice versa) to allow the first magnetic field to be applied to the binder layer 204. This may cause the plurality of magnetic flakes 206 to be oriented according to the first magnetic field. For example, as shown in FIG. 2B, this may cause one or more magnetic flakes 206, of the plurality of magnetic flakes 206 (e.g., that includes the first set of magnetic flakes 206-1 and the second set of magnetic flakes 206-2), to align with respective magnetic field lines 220 of the first magnetic field. Accordingly, at least some of the plurality of magnetic flakes 206 may be oriented within the binder layer 204 at respective non-parallel angles to a surface of the substrate 202 (e.g., the top surface of the substrate 202).

Figure 2C:
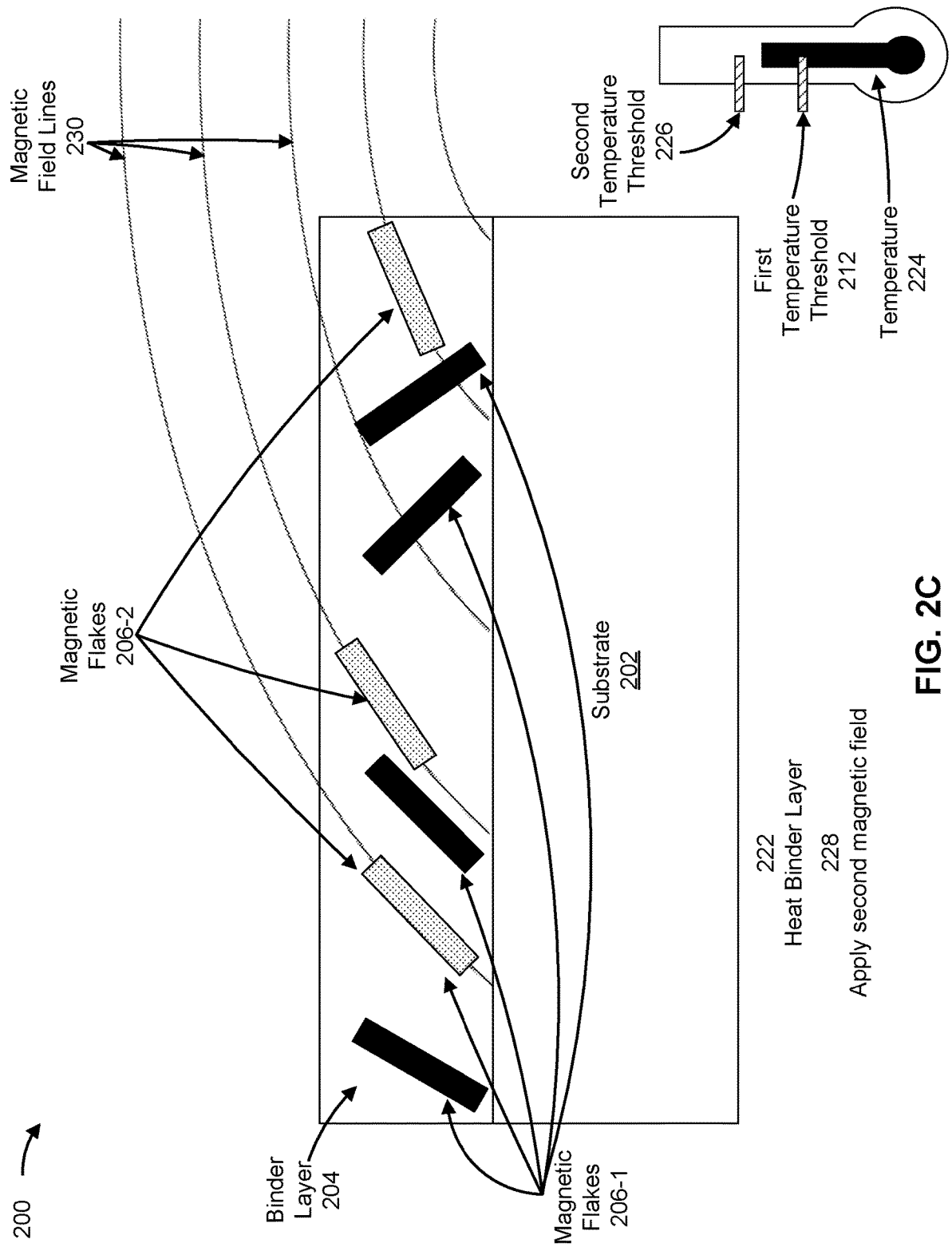

As shown in FIG. 2C, and by reference number 222, the deposition device may cause the binder layer 204 and/or the substrate 202 to be heated. For example, the deposition device may cause a laser device to apply laser heating to the binder layer 204, may cause a heated roller (e.g., an embossed roller) to contact a surface (e.g., a bottom surface) of the substrate 202, and/or may cause a heater device (e.g., an infrared heater) to apply heat to the binder layer 204 and/or the substrate 202 (e.g., in a similar manner as that described herein in relation to FIG. 1C). In this way, as further shown in FIG. 2C, the deposition device may cause a temperature 224 of the binder layer 204 and/or the substrate 202 to not satisfy (e.g., to be greater than or equal to), or to cease satisfying, the first temperature threshold 212 (e.g., that is associated with the first Curie temperature of the first set of magnetic flakes 206-1). For example, the first temperature threshold 212 may be 20 degrees C. (e.g., between −10 and 60 degrees C.) and the temperature 224 of the binder layer 204 and/or the substrate 202 after being heated may be 32 degrees C. Additionally, or alternatively, as additionally shown in FIG. 2C, the deposition device may cause the temperature 224 of the binder layer 204 and/or the substrate 202 to satisfy (e.g., to be less than) a second temperature threshold 226, which may be associated with the second Curie temperature of the second set of magnetic flakes 206-2. For example, the second temperature threshold 226 may be 62 degrees C. (e.g., greater than or equal to 61 degrees C.) and the temperature 224 of the binder layer 204 and/or the substrate 202 after being heated may be 35 degrees C.

In some implementations, after causing the binder layer 204 and/or the substrate 202 to be heated such that the temperature 224 does not satisfy, or ceases to satisfy, the first temperature threshold 212, the first set of magnetic flakes 206-1 may not exhibit, or may no longer exhibit, a ferromagnetic property. The first set of magnetic flakes 206-1 therefore may not be susceptible to being oriented according to a magnetic field. Additionally, or alternatively, after causing the binder layer 204 and/or the substrate 202 to be heated such that the temperature 224 satisfies the second temperature threshold 226, the second set of magnetic flakes 206-2 may (continue to) exhibit a ferromagnetic property. The second set of magnetic flakes 206-2 therefore may be susceptible to being oriented according to a magnetic field.

As further shown in FIG. 2C, and by reference number 228, the deposition device may apply a second magnetic field (e.g., that is the same as or different from the first magnetic field) to the binder layer 204 (e.g., when the temperature 224 does not satisfy the first temperature threshold 212 and/or the temperature 224 satisfies the second temperature threshold 226). For example, the deposition device may include, or may be associated with, a second magnet assembly that includes one or more permanent magnets. The second magnet assembly may create the second magnetic field that includes magnetic field lines 230. The deposition device may cause the second magnet assembly to be positioned near the substrate 202 (e.g., by moving the second magnet assembly towards the substrate 202, or vice versa) to allow the second magnetic field to be applied to the binder layer 204. This may cause the second set of magnetic flakes 206-2 (and not the first set of magnetic flakes 206-1) to be oriented according to the second magnetic field. For example, as shown in FIG. 2C, this may cause one or more magnetic flakes 206-2, of the second set of magnetic flakes 206-2, to align with respective magnetic field lines 230 of the second magnetic field. Accordingly, at least some of the second set of magnetic flakes 206-2 may be oriented within the binder layer 204 at respective non-parallel angles to a surface of the substrate 202 (e.g., the top surface of the substrate 202). Moreover, as further shown in FIG. 2C, because the first set of magnetic flakes 206-1 are not affected by the second magnetic field, the first set of magnetic flakes 206-1 may remain oriented according to the first magnetic field (e.g., an orientation of the first set of magnetic flakes 206-1 does not change).

While FIGS. 2B and 2C show the magnetic field lines 220 of the first magnetic field and the magnetic field lines 230 of the second magnetic field as similarly oriented in a particular one-dimensional direction, implementations include the magnetic field lines 220 and the magnetic field lines 230 being similarly or differently oriented in two dimensions (e.g., across the surface of the substrate 202 and/or the binder layer 204). For example, the magnetic field lines 220 and the magnetic field 230 may have an orthogonal orientation to each other. This may cause the first set of magnetic flakes 206-1 to have an orthogonal orientation to the second set of magnetic flakes 206-2, which may facilitate an appearance of a metameric effect (e.g., a color-shifting effect) associated with the binder layer 204.

Figure 2D:
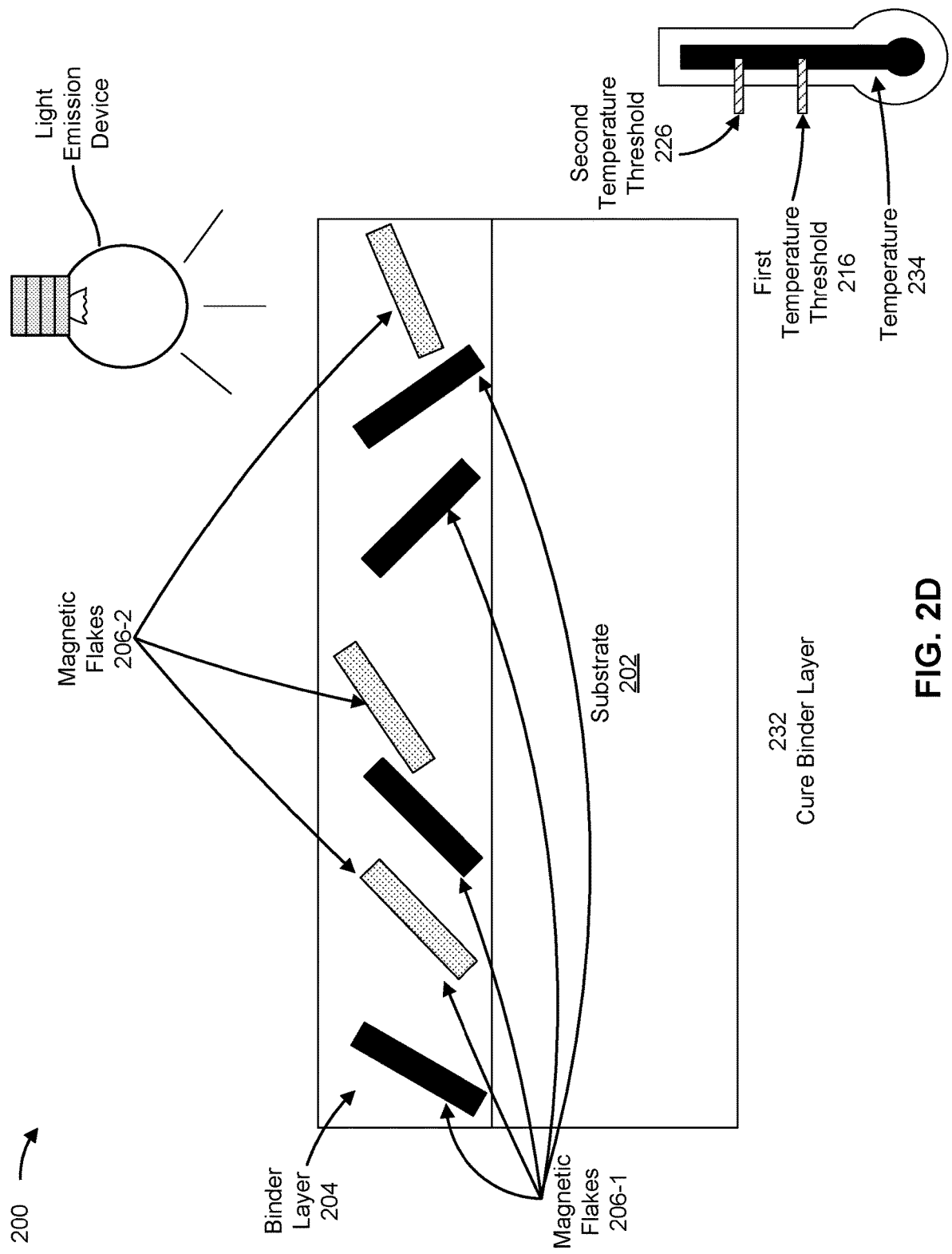

As shown in FIG. 2D, and by reference number 232, the deposition device may cure the binder layer 204. For example, the deposition device may cause a light emission device (e.g., that includes an LED and/or an incandescent light) to generate and apply UV light to the binder layer 204 and/or the substrate 202. This may cause cross linking within the binding layer 204 that allows the binder layer 204 to cure. As another example, the deposition device may cause a laser device, a heated roller, and/or a heater device, among other examples, to apply heat to the binder layer 204 and/or the substrate 202. This may cause a temperature 234 of the binder layer 204 to be associated with a temperature that allows the binder layer 204 to cure, which may be greater than the first temperature threshold 212 (e.g., that is associated with the first Curie temperature of the first set of magnetic flakes 206-1) and/or the second temperature threshold 226 (e.g., that is associated with the second Curie temperature of the second set of magnetic flakes 206-2).

In this way, an orientation of the plurality of magnetic flakes 206 may be fixed within the binder layer 204. For example, the first set of magnetic flakes 206-1 may be fixed at a first orientation (e.g., according to the first magnetic field) and the second set of magnetic flakes 206-2 may be fixed at a second orientation (e.g., according to the second magnetic field) within the binder layer 204.

As indicated above, FIGS. 2A-2D are provided merely as one or more examples. Other examples may differ from what is described with regard to FIGS. 2A-2D.

Figure 3:
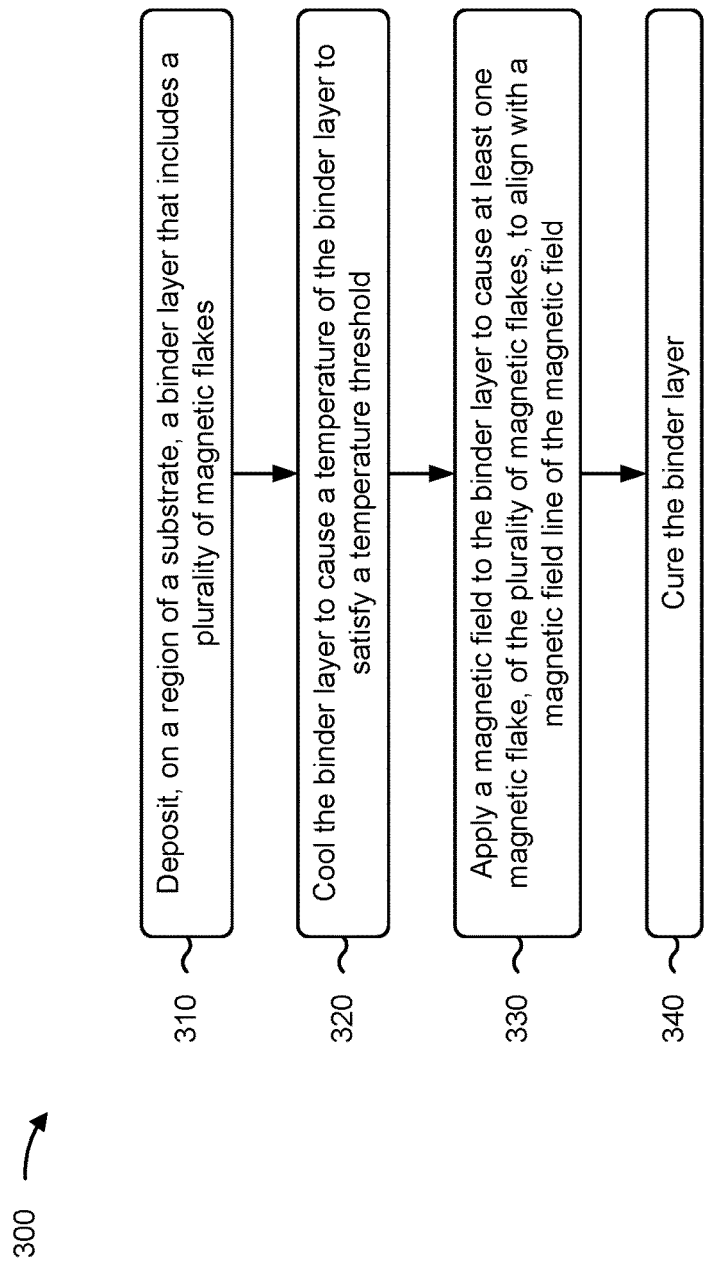
FIGS. 3-4 are flowcharts of example processes relating to orienting magnetic flakes within a binder layer.

FIG. 3 is a flowchart of an example process 300 associated with orienting magnetic flakes within a binder layer. In some implementations, one or more process blocks of FIG. 3 may be performed by a deposition device, such as a deposition device described herein in relation to FIGS. 1A-1D and/or FIGS. 2A-2D. In some implementations, one or more process blocks of FIG. 3 may be performed by another device or a group of devices separate from or including the deposition device, such as a laser device, a heated roller, a heater device, a magnet assembly, and/or the like.

As shown in FIG. 3, process 300 may include depositing, on a region of a substrate, a binder layer that includes a plurality of magnetic flakes (block 310). For example, the deposition device may deposit, on a region of a substrate, a binder layer that includes a plurality of magnetic flakes, as described above. In some implementations, the plurality of magnetic flakes comprises magnetic color-shifting pigment flakes and the substrate is a security article.

As further shown in FIG. 3, process 300 may include cooling the binder layer to cause a temperature of the binder layer to satisfy a temperature threshold (block 320). For example, the deposition device may cool the binder layer to cause a temperature of the binder layer to satisfy a temperature threshold, as described above. In some implementations, the temperature threshold is associated with a Curie temperature of the plurality of magnetic flakes. In some implementations, the temperature threshold is between −10 and 60 degrees Celsius.

As further shown in FIG. 3, process 300 may include applying a magnetic field to the binder layer to cause at least one magnetic flake, of the plurality of magnetic flakes, to align with a magnetic field line of the magnetic field (block 330). For example, the deposition device may apply a magnetic field to the binder layer to cause at least one magnetic flake, of the plurality of magnetic flakes, to align with a magnetic field line of the magnetic field, as described above.

As further shown in FIG. 3, process 300 may include curing the binder layer (block 340). For example, the deposition device may cure the binder layer, as described above.

In some implementations, process 300 includes heating a portion of the binder layer associated with a first subregion of the substrate to cause the temperature of the portion of the binder layer to cease satisfying the temperature threshold, and applying another magnetic field to the binder layer to cause at least one magnetic flake, of a set of magnetic flakes of the plurality of magnetic flakes not included in the portion of the binder layer, to align with a magnetic field line of the other magnetic field.

In some implementations, the plurality of magnetic flakes includes a first set of magnetic flakes and a second set of magnetic flakes, and process 300 includes, prior to curing the binder layer, heating the binder layer to cause the temperature of the binder layer to cease satisfying the temperature threshold and to satisfy an additional temperature threshold, and applying another magnetic field to the binder layer to cause at least one magnetic flake, of the second set of magnetic flakes, to align with a magnetic field line of the other magnetic field. The temperature threshold may be associated with a first Curie temperature of the first set of magnetic flakes and the additional temperature threshold may be associated with a second Curie temperature of the second set of magnetic flakes. In some implementations, applying the other magnetic field does not cause an orientation of the first set of magnetic flakes to change.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
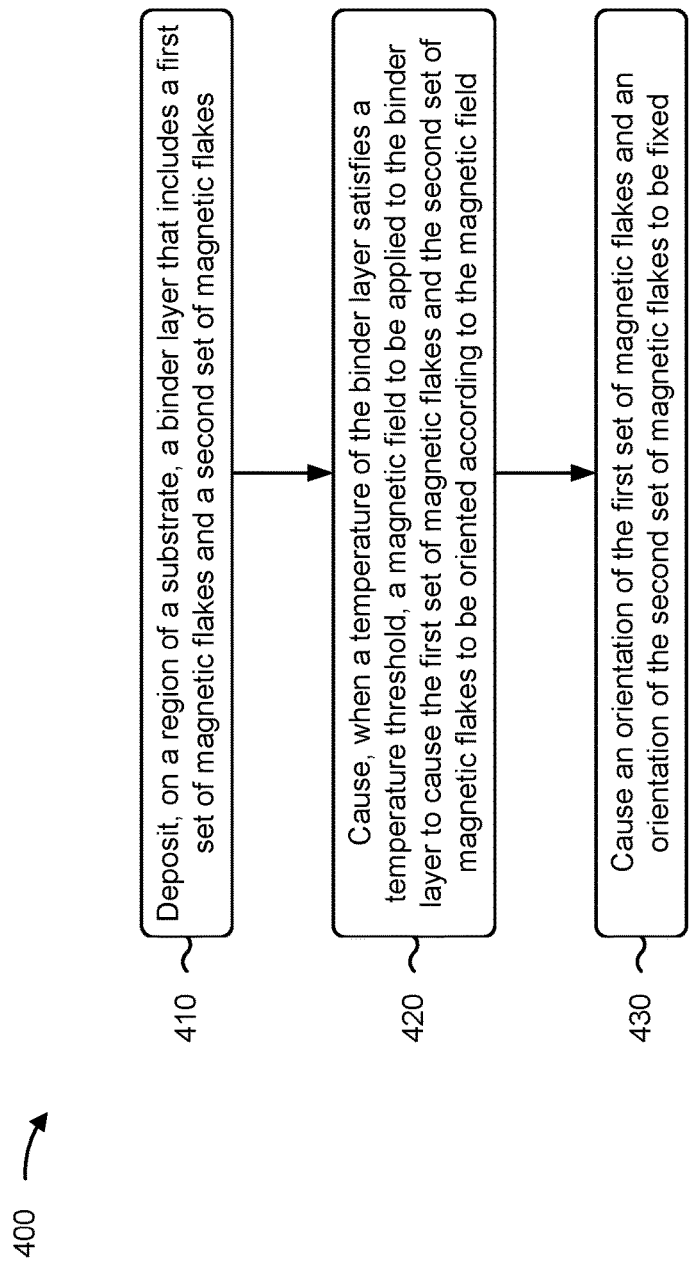

FIG. 4 is a flowchart of an example process 400 associated with orienting magnetic flakes within a binder layer. In some implementations, one or more process blocks of FIG. 4 may be performed by a deposition device, such as a deposition device described herein in relation to FIGS. 1A-1D and/or FIGS. 2A-2D. In some implementations, one or more process blocks of FIG. 4 may be performed by another device or a group of devices separate from or including the deposition device, such as a laser device, a heated roller, a heater device, a magnet assembly, and/or the like.

As shown in FIG. 4, process 400 may include depositing, on a region of a substrate, a binder layer that includes a first set of magnetic flakes and a second set of magnetic flakes (block 410). For example, the deposition device may deposit, on a region of a substrate, a binder layer that includes a first set of magnetic flakes and a second set of magnetic flakes, as described above. In some implementations, depositing the binder layer causes the first set of magnetic flakes and the second set of magnetic flakes to be approximately parallel to a surface of the substrate. In some implementations, the first set of magnetic flakes includes gadolinium and the second set of magnetic flakes includes stainless steel.

As further shown in FIG. 4, process 400 may include causing, when a temperature of the binder layer satisfies a temperature threshold, a magnetic field to be applied to the binder layer to cause the first set of magnetic flakes and the second set of magnetic flakes to be oriented according to the magnetic field (block 420). For example, the deposition device may cause, when a temperature of the binder layer satisfies a temperature threshold, a magnetic field to be applied to the binder layer to cause the first set of magnetic flakes and the second set of magnetic flakes to be oriented according to the magnetic field, as described above. In some implementations, causing the magnetic field to be applied to the binder layer causes at least some of the first set of magnetic flakes and at least some of the second set of magnetic flakes to be oriented at respective non-parallel angles to a surface of the substrate. The temperature threshold may be between −10 and 60 degrees Celsius.

As further shown in FIG. 4, process 400 may include causing an orientation of the first set of magnetic flakes and an orientation of the second set of magnetic flakes to be fixed (block 430). For example, the deposition device may cause an orientation of the first set of magnetic flakes and an orientation of the second set of magnetic flakes to be fixed, as described above.

In some implementations, a first portion of the binder layer that comprises the first set of magnetic flakes is deposited on a first subregion of the substrate and a second portion of the binder layer that comprises the second set of magnetic flakes is deposited on a second subregion of the substrate, and process 400 may include, prior to causing the orientation of the first set of magnetic flakes and the orientation of the second set of magnetic flakes to be fixed, causing a temperature of the first portion of the binder layer to cease satisfying the temperature threshold, and applying another magnetic field to the binder layer to cause the second set of magnetic flakes to be oriented according to the other magnetic field within the second portion of the binder layer. In some implementations, applying the other magnetic field to the binder layer does not cause the orientation of the first set of magnetic flakes to change.

In some implementations, the binder layer includes a heterogeneous mix of the first set of magnetic flakes and the second set of magnetic flakes on the region of the substrate, and process 400 may include, prior to causing the orientation of the first set of magnetic flakes and the orientation of the second set of magnetic flakes to be fixed, applying, when the temperature of the binder layer ceases to satisfy the temperature threshold, another magnetic field to the binder layer to cause the second set of magnetic flakes to be oriented according to the other magnetic field, wherein applying the another magnetic field does not cause the first set of magnetic flakes to be oriented according to the other magnetic field. In some implementations, the temperature threshold is associated with a Curie temperature of the first set of magnetic flakes.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A method, comprising:
   depositing, by a deposition device and on a surface of a substrate, a binder layer that includes a plurality of magnetic flakes;
   applying, by the deposition device, a first magnetic field to the binder layer to cause a first magnetic flake, of the plurality of magnetic flakes, to align with a first magnetic field line of the first magnetic field;
   applying, by the deposition device, a second magnetic field to the binder layer to cause a second magnetic flake, of the plurality of magnetic flakes, to align with a second magnetic field line of the second magnetic field,
      wherein, during application of the second magnetic field to the binder layer, the first magnetic flake does not exhibit a ferromagnetic property; and
   curing, by the deposition device, the binder layer.

2. The method of claim 1, further comprising:
   causing, prior to applying the first magnetic field to the binder layer, a temperature of the binder layer to satisfy a Curie temperature of the plurality of magnetic flakes; and
   causing, prior to applying the second magnetic field to the binder layer, a temperature of a portion of the binder layer to cease satisfying the Curie temperature,
      wherein the portion of the binder layer does not include the second magnetic flake.

3. The method of claim 2, wherein the Curie temperature is between −10 Celsius and 60 degrees Celsius.

4. The method of claim 2, wherein the portion of the binder layer is a first portion of the binder layer, and
   wherein causing the temperature of the portion of the binder layer to cease satisfying the Curie temperature comprises:
      applying an insulative mask to a second portion of the binder layer,
         wherein the second portion of the binder layer includes the second magnetic flake, and
      causing a heater device to apply heat to the binder layer.

5. The method of claim 1, wherein the substrate is a security article.

6. The method of claim 1, wherein the plurality of magnetic flakes includes a first set of magnetic flakes and a second set of magnetic flakes,
   wherein the first set of magnetic flakes includes the first magnetic flake,
   wherein the second set of magnetic flakes includes the second magnetic flake, and
   wherein the method further comprises:
      causing, prior to applying the second magnetic field to the binder layer, a temperature of the binder layer to not satisfy a Curie temperature of the first set of magnetic flakes and to satisfy a second Curie temperature of the second set of magnetic flakes.

7. The method of claim 1, wherein the plurality of magnetic flakes have a color shifting property.

8. A method, comprising:
   depositing, by a deposition device and on a surface of a substrate, a binder layer that includes a first set of magnetic flakes and a second set of magnetic flakes;
   causing, by the deposition device, a first magnetic field to be applied to the binder layer to cause the first set of magnetic flakes and the second set of magnetic flakes to be oriented according to the first magnetic field;

causing, by the deposition device, a second magnetic field to be applied to the binder layer to cause the second set of magnetic flakes to be oriented according to the second magnetic field,
- wherein, during application of the second magnetic field to the binder layer, the first set of magnetic flakes do not exhibit a ferromagnetic property; and causing, by the deposition device, an orientation of the first set of magnetic flakes and an orientation of the second set of magnetic flakes to be fixed in an asymmetric arrangement on the substrate.

9. The method of claim 8, wherein causing the orientation of the first set of magnetic flakes and the orientation of the second set of magnetic flakes to be fixed in the asymmetric arrangement on the substrate comprises:
- causing a light emission device to generate and apply ultraviolet light to the binder layer.

10. The method of claim 8, wherein the first set of magnetic flakes includes a material that is different than a material of the second set of magnetic flakes.

11. The method of claim 8, wherein the first set of magnetic flakes has a Curie temperature that is different than a Curie temperature of the second set of magnetic flakes.

12. The method of claim 8, wherein a first portion of the binder layer comprises the first set of magnetic flakes,
- wherein a second portion of the binder layer comprises the second set of magnetic flakes, and
- wherein the method further comprises, prior to causing the second magnetic field to be applied to the binder layer:
  - causing a temperature of the first portion of the binder layer to cease satisfying a Curie temperature of the first set of magnetic flakes.

13. The method of claim 12, wherein the Curie temperature of the first set of magnetic flakes is equal to a Curie temperature of the second set of magnetic flakes.

14. The method of claim 8, wherein the binder layer includes a mix of the first set of magnetic flakes and the second set of magnetic flakes, and
- wherein the method further comprises, prior to causing the second magnetic field to be applied to the binder layer:
  - causing a temperature of the binder layer to cease satisfying a Curie temperature of the first set of magnetic flakes.

15. A method, comprising:
depositing, by a deposition device and on a region of a substrate, a binder layer that includes a plurality of magnetic flakes;
applying, by the deposition device, a first magnetic field to the binder layer to cause a first magnetic flake, of the plurality of magnetic flakes, to align with a first magnetic field line of the first magnetic field; and
applying, by the deposition device, a second magnetic field to the binder layer to cause a second magnetic flake, of the plurality of magnetic flakes, to align with a second magnetic field line of the second magnetic field,
- wherein, during application of the second magnetic field to the binder layer, the first magnetic flake does not exhibit a ferromagnetic property, and
- wherein one or more of:
  - the plurality of magnetic flakes comprises magnetic color-shifting pigment flakes, or
  - the substrate includes one of currency, a bank note, an identification card, or a transaction card.

16. The method of claim 15, wherein the plurality of magnetic flakes comprises the magnetic color-shifting pigment flakes.

17. The method of claim 15, wherein the first magnetic flake is associated with a first particular pigment, and
wherein the second magnetic flake is associated with a second particular pigment.

18. The method of claim 15, wherein the plurality of magnetic flakes have a Curie temperature between −10 degrees Celsius and 60 degrees Celsius.

19. The method of claim 15, wherein the second magnetic flake has a Curie temperature that is higher than a Curie temperature of the first magnetic flake.

20. The method of claim 15, wherein the substrate includes one of the currency, the bank note, the identification card, or the transaction card.

\* \* \* \* \*